C. G. MOLLAN.
HEADLIGHT LAMP.
APPLICATION FILED OCT. 2, 1914.
1,212,145.
Patented Jan. 9, 1917.
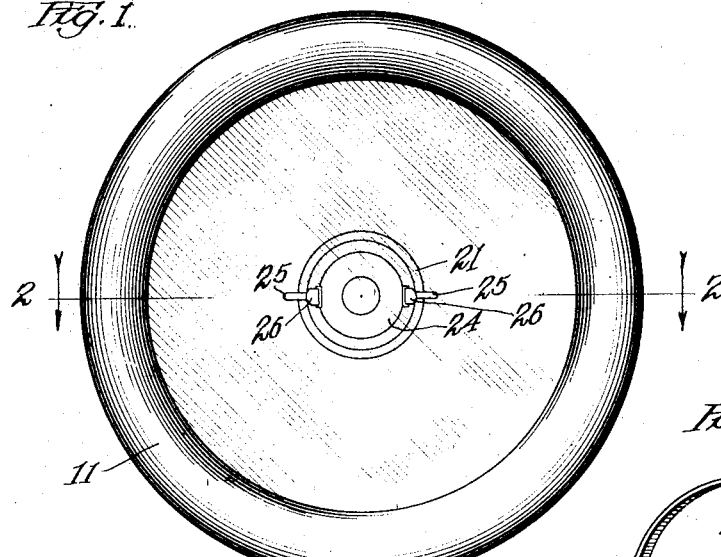
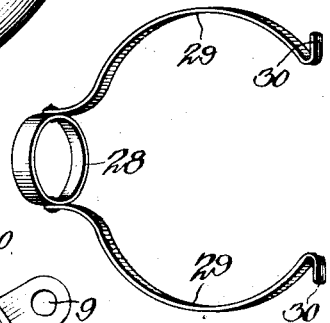
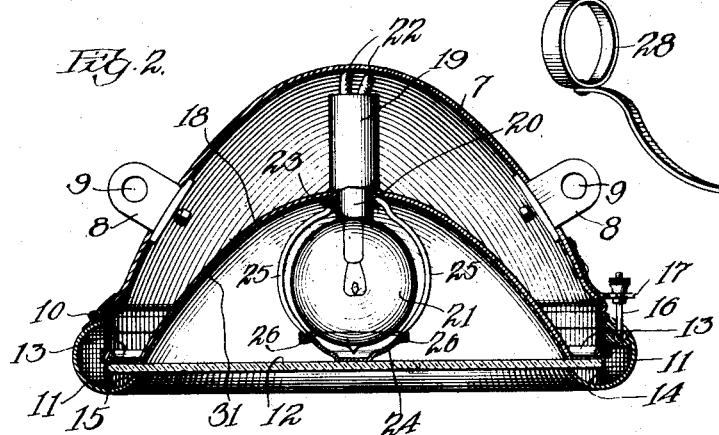
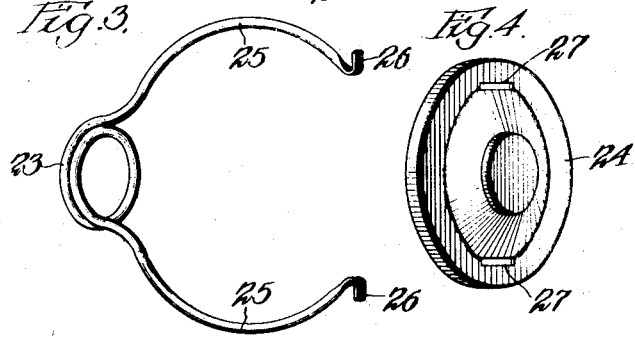
Witnesses:
Inventor:
Charles G. Mollan
By Chas. C. Tillman Atty.

UNITED STATES PATENT OFFICE.

CHARLES G. MOLLAN, OF CHICAGO, ILLINOIS.

HEADLIGHT-LAMP.

1,212,145. Specification of Letters Patent. Patented Jan. 9, 1917.

Application filed October 2, 1914. Serial No. 864,556.

*To all whom it may concern:*

Be it known that I, CHARLES G. MOLLAN, a citizen of the United States, residing at the city of Chicago, in the county of Cook and State of Illinois, have invented certain new and useful Improvements in Headlight-Lamps, of which the following is a specification.

This invention relates to improvements in lamps, and has particular relation to headlight lamps for motor vehicles, and especially automobiles, and it consists in certain peculiarities of the construction, novel arrangement and operation of the various parts thereof as will be hereinafter more fully set forth and specifically claimed.

As is well known, many States and cities have passed and strictly enforce laws and ordinances prohibiting the use of glaring and brilliant headlights, unless dimmed, on vehicles while driving on streets of cities and towns, on account of the blinding effect on pedestrians, who are frequently blinded and dazzled by said brilliant lights, and consequently are unable to see the approaching vehicle to avoid and prevent being injured thereby. These brilliant lights are very desirable for use in country driving, as they clearly disclose, in darkness, to the chauffeur or driver of the vehicle the ruts, obstacles and imperfections of the road to be avoided, and can be legally used on country roads.

It is, therefore, the principal object of the invention to provide a lamp which is especially intended to be used as a headlight for automobiles, but which is available for use as such lights on motor cycles and other vehicles, if desired, as rear or side lights, and which shall be simple and inexpensive in construction, strong, durable and efficient in operation.

A further object of the invention is to provide a lamp by which a light of the strongest degree may be produced or provided, either by electricity or gas, and so diffused and projected as to disclose the character of the road or ground surface, without impairing the vision of pedestrians or others.

Still another object of the invention is to furnish means whereby the ordinary commercial headlight lamps for automobiles, having highly polished reflectors, can be utilized and converted into a lamp embodying my improvements, with a trifling expense and with but slight change or alteration in the same.

Other objects and advantages of the invention will be disclosed in the subjoined description and explanation.

Heretofore it has been a common expedient in order to overcome the glaring effects of headlights to employ dimmers, such as translucent glass or material placed in front of the light, which have the effect of throttling the rays of light to such an extent as to prevent a proper illumination of the roadway in front of the machine or vehicle. By my improvements means is afforded whereby the glare and glitter of the light, which is blinding when the vision is directed thereto, is entirely removed or avoided, yet practically the entire force or rays of light generated by the lamp is utilized and projected forwardly of the machine or vehicle in soft yet clear, strong, and luminous rays, and in such a manner that the brilliancy or glare of the blaze or filament of the light will not have blinding or glaring effect on the vision, even if the vision is directed toward the light or lamp.

In the accompanying drawing, which serves to illustrate the invention—Figure 1 is a front face view of a lamp embodying the improvements; Fig. 2 is a horizontal sectional view taken on line 2—2 of Fig. 1, looking in the direction indicated by the arrows; Fig. 3 is an enlarged detached perspective view of one form of the spring holder for the light shield; Fig. 4 is a detached perspective view of the shield, and Fig. 5 is a similar view of a modified form of the holder for the shield.

Like numerals of reference refer to corresponding parts throughout the different views of the drawing.

The reference numeral 7 designates the lamp casing, which may be of any suitable size, form and material, but preferably of metal and of substantially the shape as shown in Fig. 2; that is, concavo-convex. At each of its sides the casing 7 is provided with a bracket 8, having an opening 9, to receive suitable supports of the ordinary kind mounted on the vehicle in the usual manner. Secured to the front part of the casing by means of a hinge 10 is a ring-like plate or cover holder 11, for a plate of glass 12, or other transparent material, which may be held in place on the holder 11, by means of a ring 13, of wire or other suitable material, which is expanded against the inner wall 14 of the holder 11, and rests against the plate 12, so as to press the same against the inner edge 15 of the holder 11, as will be readily understood by reference to Fig. 2 of the drawing.

The holder 11 may be fastened in its closed position, as shown in Fig. 2, by means of a rod 16, pivotally connected at one of its ends to the holder 11, and adapted to engage a catch 17 carried by the casing 7, at a proper point thereon for engagement with said rod. Located within the casing 7 is a light diffuser 18, which is concavo-convex in shape, with its open portion presented toward the glass plate 12, against which plate the front edge of the diffuser 18 may rest, if desired. At its rear central portion the diffuser 18 is provided with a rearwardly projecting tubular extension 19, in the front portion of which the socket 20 of an electric light bulb or lamp 21 may be fitted in any suitable manner. From the socket 20, the electric conductors 22 of the lamp are extended through the tubular projection 19, and may lead therefrom through a suitable opening (not shown) in the lamp casing. Fitted around the lamp socket 20, is a coil 23 of the spring support or holder for the shield 24, which support or holder consists of a wire provided with the coil 23, and having extended from opposite sides thereof arms 25, which are preferably resilient and curved to correspond with the shape of the light bulb. At its free end each of the arms 25 is provided with an out-turned flattened portion 26 to engage slots 27 formed in the shield 24 at points diametrically opposite each other. The shield 24 is preferably made of thin sheet material, such as aluminum, and is by preference concavo-convex, as shown, and when in position on the arms 25 will be held near or against the inner surface of the glass plate 12, but directly in front of the lamp or light bulb so as to prevent the light being seen directly. Instead of using a holder for the shield 24 of the construction shown in Fig. 3 and above described, one of the form shown in Fig. 5, and consisting of a ring 28 to fit around the lamp socket 20 and arms 29, extending from said ring on opposite sides thereof, and provided with projections 30, at their free ends, may be employed. The front or concave surface of the light diffuser or reflector 18, is provided with a lining 31 of dead white material, so as to diffuse the rays of light from the lamp or light producer and to project the same without any glare or glitter.

Having thus fully described my invention what I claim and desire to secure by Letters Patent is—

1. A headlight lamp including a concavo-convex light diffuser having a lusterless front surface, a light producer supported centrally in front of said diffuser, and a shield supported in front of the light producer.

2. A headlight lamp consisting of a hollow casing having one of its ends open, a plate of transparent material mounted on the open end of said casing, a light diffuser supported within the casing and having its front surface lusterless, a light producer in front of said diffuser, and a shield supported in front of the light producer.

3. In a headlight lamp, the combination with a hollow casing, of a light diffuser having a lusterless front surface and provided with a hollow extension, a socketed lamp having its socket fitted in the front portion of said hollow extension, a holder located around the lamp socket and having arms extended forwardly of the lamp, and a shield mounted on the front parts of said arms.

4. The combination with a light diffuser having a symmetrically curved concavity provided with a lusterless front surface, of a source of light located approximately at the focal point of the diffuser curve, and a shield supported in front of said light source.

5. In a headlight lamp, the combination with a lamp support, of a socketed lamp mounted thereon, a holder comprising a circular one-piece member surrounding the lamp socket and engaging the same and arms extended from said member forwardly of the lamp, and a shield detachably mounted on the front parts of said arms.

6. In a headlight lamp, the combination with a support, of a socketed lamp mounted thereon, a holder consisting of a single piece provided about midway between its ends with a ring to encircle and engage the lamp socket and having at its free ends deflected portions, and a shield provided with slots to receive said deflected portions.

7. In a headlight lamp, the combination with a support, of a socketed lamp mounted thereon, a holder consisting of a single piece provided about midway between its ends with a ring to encircle and engage the lamp socket and having resilient arms projected forwardly of said socket and approximated at their free ends, and a shield having means to engage said arms at their free portions.

8. The combination with an incandescent lamp of a holder comprising a one-piece member surrounding the lamp base and engaging the same, and resilient arms extended from said member toward the outer end of said lamp, and a shield surrounding the end of the lamp and detachably mounted on the outer ends of said arms, said shield having a limited area to permit sideward rays from the lamp.

CHARLES G. MOLLAN.

Witnesses:
 CHAS. C. TILLMAN,
 A. S. PHILLIPS.